United States Patent [19]

Wilska

[11] 3,793,585

[45] Feb. 19, 1974

[54] MOISTURE MONITOR HAVING A RESISTOR BETWEEN SENSING CAPACITOR AND OSCILLATOR TUNED INPUT TO IMPROVE OSCILLATOR RESPONSE

[76] Inventor: Matti Gunnar Wilska, Ukonkivenpolku 2C 27, Helsinki, Finland

[22] Filed: Feb. 2, 1972

[21] Appl. No.: 222,790

[52] U.S. Cl. .............................. 324/61 QS, 331/65
[51] Int. Cl. ............................................ G01r 27/02
[58] Field of Search .................... 324/61 QS; 331/65

[56] References Cited
UNITED STATES PATENTS

| | | | |
|---|---|---|---|
| 2,395,368 | 2/1946 | Bull | 331/65 X |
| 2,946,949 | 7/1960 | Dopheide | 331/65 UX |
| 3,546,628 | 12/1970 | Zitter | 331/65 X |
| 3,408,560 | 10/1968 | Felix et al. | 324/61 QS |
| 2,671,200 | 3/1954 | Lederer | 324/61 QS |
| 2,529,846 | 11/1950 | McBrayer et al. | 324/61 QS |
| 2,807,720 | 9/1957 | Charles | 324/61 QS |

FOREIGN PATENTS OR APPLICATIONS

| | | | |
|---|---|---|---|
| 1,082,872 | 9/1967 | Great Britain | 324/61 QS |

Primary Examiner—Stanley T. Krawczewicz
Attorney, Agent, or Firm—Mason, Fenwick & Lawrence

[57] ABSTRACT

An electrical circuit provides a measurement or control in accordance with the moisture content of a specimen or sample, and includes: a capacitive cell comprising two spaced and insulated metal plates between which the specimen or sample can be placed to act as a part of a dielectric between the two plates; an oscillatory circuit to which said capacitive cell is coupled in such a manner that variations in the capacitance of the cell produces variations in the state of loading of said oscillatory circuit; and output means providing a measurement and/or a control in accordance with the said state of loading of said oscillatory circuit.

13 Claims, 2 Drawing Figures

PATENTED FEB 19 1974 3,793,585

MOISTURE MONITOR HAVING A RESISTOR BETWEEN SENSING CAPACITOR AND OSCILLATOR TUNED INPUT TO IMPROVE OSCILLATOR RESPONSE

This invention relates to moisture meters and more particularly to an electric circuit for such meters.

Moisture meters are known which operate on changes in the dielectric properties of matter containing the moisture to be measured, but such meters, when embodied in practical form, require a comparatively complex and large-sized structure. Their use, and the interpretation of measurements, are difficult to one unfamiliar with technical matters, and they are, in fact, primarily intended for laboratory use.

An object of the present invention is the provision of an improved electrical circuit for a moisture meter.

According to the present invention an electrical circuit providing a measurement or control in accordance with the moisture content of a specimen or sample, and includes: a capacitive cell comprising two spaced and insulated metal plates between which the specimen or sample can be placed to act as a part of a dielectric between the two plates; an oscillatory circuit to which said capacitive cell is coupled in such a manner that variations in the capacitance of the cell produces variations in the state of loading of said oscillatory circuit; and output means providing a measurement and/or a control in accordance with the said state of loading of said oscillatory circuit.

The invention will now be described, by way of example, with reference to the accompanying drawings, in which.

Figure 1:
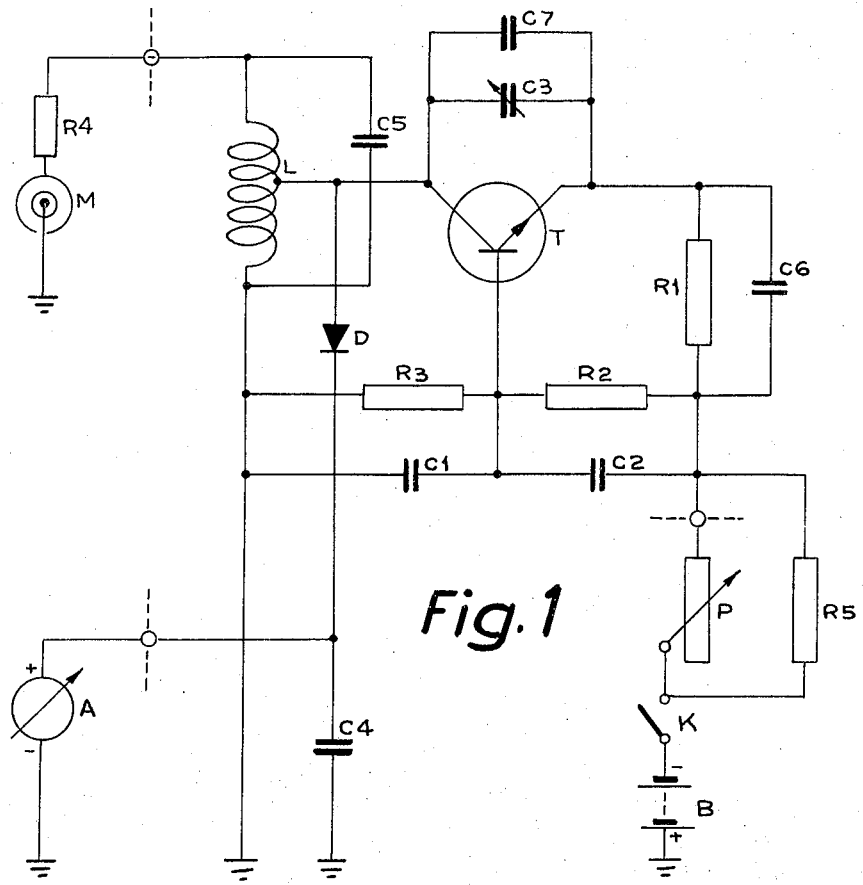
FIG. 1 is a circuit diagram of an electrical circuit of a moisture meter.

Referring first to FIG. 1, a transistor T is connected to act as an oscillator operating at a frequency in the order of several tens of megahertz. The frequency of oscillation is determined mainly by the values of a resonant circuit associated with the collector circuit of the transistor. The collector circuit includes a tapped inductance L, a capacitor C5 and a measuring cell M comprising spaced plates between which a mass of moist material is placed for an assessment of its water content. Suitably, the cell M comprises outer and inner electrodes defining an annular space into which the specimens or sample is placed. The inner electrode can be a rod, or a cylindrical metal member, while the outer member in each case is a cylindrical metal member. The circuit is energised by a battery B having its positive pole connected to ground and its negative pole connected through an on/off switch K and a variable resistor P to one end of a voltage dividing chain consisting of series connected resistors R2 and R3, the remote end of the chain being connected to ground. The variable resistor P is shunted by a fixed resistor R5. The junction of resistor P and resistor R2 is connected through a resistor R1 to the emitter of the transistor T, and resistor R1 is by-passed as regards alternating currents by a capacitor C6. The two resistors R2 and R3 are similarly by-passed as regards alternating currents by two series connected capacitors C2 and C1, and the junction of the two capacitors is connected to the junction of resistors R2 and R3 and to the base of the transistor T. The collector of the transistor is connected to the tapping on the inductance L, and in the forward direction through a diode D and a series connected capacitor C4 to ground. One junction of inductance L and capacitor C5 is connected to ground, and the other junction is connected through a resistor R4 to one of the spaced plates of the measuring cell M, the other plate of that cell being connected to ground. Feedback between the collector and emitter of the transistor T is provided by fixed capacitor C7 and a shunting variable capacitor C3.

The values of the various resistors and capacitors are chosen to provide the desired frequency of oscillation by the transistor T. In the example shown, it was found that the resistances of resistor P and resistor R5 should be about ten times the resistance of resistor R1. The capacitors C1 and C2 are of such size that they pass the oscillatory a.c. currents and permit the potential of the transistor base electrode to remain substantially constant.

The amplitude of the oscillations produced in the circuit shown can be varied by adjustment of the capacitor C3, which controls the amount of positive feedback in the circuit.

The degree of loading of the oscillatory circuit is indicated by the reading of direct current voltmeter A, which is connected between ground and the junction between capacitor C4 and the diode D and indicates the a.c. voltage developed across capacitor C4.

Figure 2:
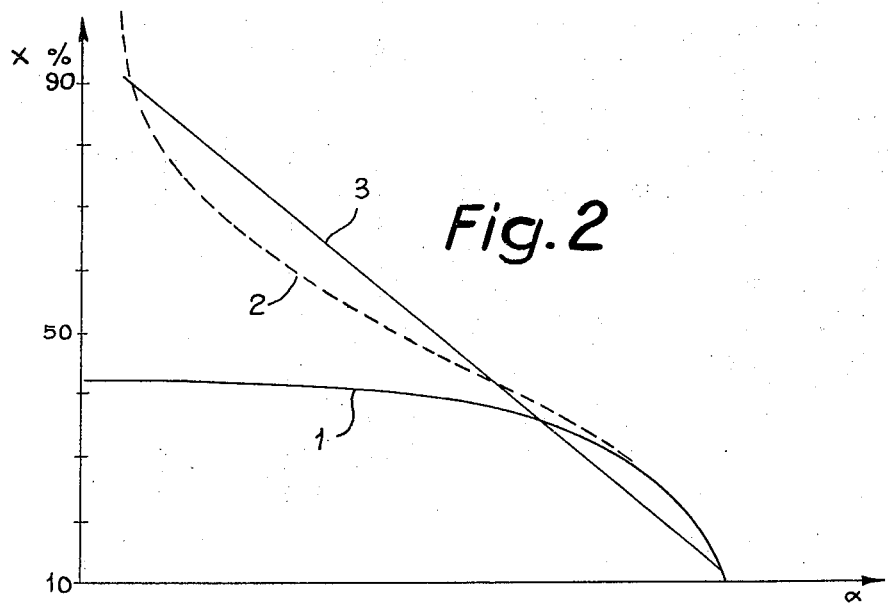
FIG. 2 shows graphically operating characteristics of the electrical circuit of FIG. 1, and of a modification to that circuit.

The material, the moisture content of which is to be measured, is placed between the spaced plates of the cell M, and it causes an increase in the capacitance of this cell. Since the frequency of oscillation of the transistor T is determined by the value of the capacitance in the resonant circuit comprising capacitance C5, the cell M and the inductance L, any change in the dielectric constant of the material in the cell M will cause a change in the frequency of oscillation of the transistor. If the resistor R4 were not present, then as the moisture content varied, the curve 1 of FIG. 2 would be followed. In FIG. 2, the deflection X of the meter A (and since the meter scale is linear, the voltage across the meter) is related to the moisture content X plotted vertically in that figure.

The material being examined has a dielectric constant greater than that of air, and the capacitance of the cell is increased by the material. The dielectric constant of the material depends upon its moisture content, and as a rule increases with increasing moisture content, so that its capacitance increases with moisture content. However, the insulation resistance (or the resistive component of the impedance of the cell M) decreases with increase in the moisture content of the specimen. It follows that an increase in the moisture content of the specimen leads to an increase in the resistive current passing through the cell. It is found that at relatively low moisture contents, for example contents of less than 50 per cent, the resistive current so loads the oscillator that the oscillation stops. However, by the insertion of the resistor R4 as shown in series with the measuring cell M, the curve 2 of FIG. 2 is obtained. From a study of curves 1 and 2 of FIG. 2, it will be seen that in the absence of the resistor R4 a useful indication of moisture content is obtained over the range of moisture contents lying between about 10 and 40 per cent. At moisture contents lying above 40 per cent, the meter deflection rapidly approaches zero, showing that the oscillatory circuit has gone out of oscillation.

On the other hand, upon the addition of the resistor R4 the more useful curve 2 is obtained, permitting the measurement of moisture contents over the range from about 10 percent to about 8 percent. The ideal curve would of course be the rectilinear curve 3, but for practical purposes the curve 2 is a suitable approximation. The actual graduation of the meter dial can be selected to suite the characteristic curve 2.

It has been found that the choice of the size of the resistor R4 is critical. Thus, if the value of R4 is too small, the oscillation will cease, while if an excessive value is used for resistor R4, the curve 2 is found to rise too steeply, thus lowering the resolution of the measurements, i.e., the ability to obtain accurate measurements. In the circuit actually shown, it was found that if resistor R4 has a value of 730 ohms a very good performance was obtained. However, it must be appreciated that this value may not apply to other arrangements in which the dimensions of the measuring cell may be different. Thus, typically the resistance of resistor R4 will lie in the range 0.5 to 1.0 kilohms.

In the use of the apparatus shown and described above, as the moisture content of the sample being examined is increased, the capacitance of the capacitor formed by the measuring cell M increases, and the frequency at which the circuit oscillates therefore decreases. On decrease of the frequency, the feedback current in the oscillator, through the feedback capacitors C3 and C7, also decreases, which further contributes to decrease of the current in the oscillating circuit.

The values of the feedback capacitors C3 and C7 can be varied to achieve either an oscillator in which the condition for oscillation is fulfilled even when the measuring cell M is shortcircuited by the sample, or to achieve an oscillator which ceases to oscillate when the capacitance of the measuring cell reaches a given value. It follows that the circuit shown in the drawings can be employed as a two-state (ON/OFF) sensing element, which causes quenching of the oscillations when a material is introduced into the field of the measuring condenser which has a dielectric constant higher than that specified as normal, or conversely, allows oscillations to start when the dielectric constant falls below a predetermined value. The range of adjustment of the variable feedback capacitor C3 can be made sufficient for the same circuit to be used in alternative ways. An on/off sensing element finds use in control systems where a control is to be effected directly in accordance with the moisture content in a specimen or sample.

A meter incorporating the circuit of the present invention will have its constants selected or pre-adjusted to suit the intended manner or purpose of measurement. The only adjustment then required is calibration of the meter A, which is effected by means of adjustment of the variable resistor P. With the measuring cell M empty of material, the deflection of the meter A is adjusted by changing the setting of resistor P, to bring the meter needle to a desired maximum scale reading, which may be the full scale deflection of the meter. This condition is one providing maximum voltage in the oscillating circuit.

In use of the meter, material introduced into the measuring cell M, causes increased capacitance of the cell M and closer coupling of resistor R4 with the oscillating circuit. This results in a lower resonance current and a reduction in the d.c. voltage, obtained by rectification by the diode D, across the capacitor C4. This reduction of voltage with increasing moisture content, plotted as X percent in FIG. 2, gives the varying output voltage indicated by graph 2 in FIG. 2. By a suitable choice of the various circuit parameters, the curve 2 can be brought to a close approximation to curve 3, i.e., a straight line.

The circuit shown in the drawings and described above is by way of example only: there are numerous different circuits which will be in accordance with the teaching of the present invention. Thus instead of using one resistor R4 in one of the leads to the spaced plates of the measuring cell M, two resistors can be used, one in each lead. Furthermore, the series connected combination of the capacitor formed by cell M and the resistor R4 can be connected elsewhere in the oscillatory circuit, for example it could be connected between the tapping on the coil L at one end of the coil, or in any other manner to affect only part of the oscillating circuit. However, there should be an increasing resistive coupling through increase of the measuring cell capacitance, causing a change in the Q (or factor of merit) of the oscillating circuit, which change is then employed for purposes of measurement or control.

It will be appreciated that it is within the scope of the present invention to employ control elements connected in parallel or in series with the measuring cell, or the associated series resistor such as resistor R4, to restore the original state of the oscillating circuit after its deviation resulting from the introduction of material into the cell, whereby the amount of control exerted to restore the conditions to their original state is an indication of the measured quantity. Using this so-called substitution method, the final reading of the meter will be the same as the original reading.

It will be apparent from the foregoing that the electrical circuit for moisture meters of the present invention provides a distinct and useful advance in the art which will be of benefit to the industry generally.

I claim:

1. An electrical circuit providing a measurement or control in accordance with the moisture content of a specimen or sample, and including:
    a. a capacitive cell comprising two spaced and insulated metal plates between which the specimen or sample can be placed to act as a part of a dielectric between the two plates;
    b. an oscillatory circuit to which said capacitive cell is coupled through a resistor so that variations in the capacitance of said cell produces variations in the resistive loading of said oscillatory circuit by said resistor; and
    c. output means providing a measurement and/or a control in accordance with the said resistive loading of said oscillatory circuit.

2. An electrical circuit according to claim 1, and in which said output means is an electrical meter providing a visual indication of the said resistive loading.

3. An electrical circuit according to claim 1, and in which the oscillatory circuit is coupled to said capacitive cell through a resistor so that an increase in the capacitance of said cell provides an increased resistive loading of said oscillatory circuit by said resistor.

4. An electrical circuit according to claim 1, and in which variation of loading of said oscillatory circuit produced by variation in the capacitance of said cell is accompanied by corresponding change in the frequency of oscillation of said oscillatory circuit.

5. An electrical circuit according to claim 1, in which said oscillatory circuit operates with positive feedback to maintain it in oscillatory condition, and feedback elements providing said positive feedback are so selected that an output voltage across said oscillatory circuit decreases as the said resistive loading of said oscillatory circuit is increased.

6. An electrical circuit according to claim 1, in which the oscillatory circuit operates with positive feedback to maintain it in oscillatory condition, and feedback elements providing said feedback are so selected that upon increase of the capacitance of said capacitive cell past a predetermined value, the condition for oscillation is no longer fulfilled and the oscillation ceases.

7. An electrical circuit according to claim 3, and in which the value of said resistor lies in the range 0.5 to 1.0 thousand ohms.

8. An electrical circuit according to claim 1, and in which the oscillatory circuit includes a transistor and a feedback capacitor is connected between the emitter electrode and the collector electrode of that transistor.

9. An electrical circuit according to claim 1, and in which the oscillatory circuit is energised through a variable resistor, and calibration of the output means is obtainable by adjustment of said variable resistor.

10. An electrical circuit according to claim 1, and in which the oscillatory circuit includes an inductance and said capacitive cell, a resistor being connected in series with said capacitive cell and the series combination of the resistor and said cell being connected in parallel with said inductance.

11. An electrical circuit according to claim 10, and in which the output means is connected to a tapping on said inductance.

12. An electrical circuit according to claim 11, and in which the output means is a d.c. device and is connected to said tapping and includes a rectifying device which applies a rectified voltage to the output means derived from said tapping.

13. An electrical circuit as claimed in claim 1, and in which the capacitive cell includes outer and inner electrodes defining an annular space into which said specimen or sample is placed.

* * * * *